United States Patent [19]

Lee et al.

[11] Patent Number: 5,079,302

[45] Date of Patent: Jan. 7, 1992

[54] POLYMERIZATION PROCESS AND THE POLYMERS THEREOF

[75] Inventors: Sunggyu Lee; Ramesh Rengarajan, both of Akron, Ohio

[73] Assignee: University of Akron, Akron, Ohio

[21] Appl. No.: 467,491

[22] Filed: Jan. 19, 1990

[51] Int. Cl.$^5$ .................. C08F 285/00; C08F 255/02
[52] U.S. Cl. .................. 525/256; 525/322; 525/324
[58] Field of Search .......... 526/261, 204, 86; 525/69, 256

[56] References Cited

U.S. PATENT DOCUMENTS

| | | | |
|---|---|---|---|
| 2,910,456 | 10/1959 | Gooreynd et al. | 526/261 |
| 3,049,517 | 8/1962 | Caton | 526/261 |
| 3,177,270 | 4/1965 | Jones et al. | 525/263 |
| 3,404,135 | 10/1968 | Tietz | 526/204 |
| 4,683,248 | 7/1987 | Rauer et al. | 521/96 |
| 4,735,992 | 4/1988 | Nogues | 525/64 |

OTHER PUBLICATIONS

H. Alberts, H. Bartl, and R. Kuhn, Grafting of Styrene and Acrylonitrile onto Ethylene Polymers in the Book Compolymers, Polyblends, and Composites, [Norbert A. J. Platzer, editor], American Chemical Society, Washington, D.C., 1975, pp. 214-230.

John K. Stille, Introduction to Polymer Chemistry, 1962, p. 214, [John Wiley and Sons, Inc.].

Primary Examiner—Joseph L. Schofer
Assistant Examiner—Wu C. Chen
Attorney, Agent, or Firm—Oldham & Oldham Company

[57] ABSTRACT

A catalytic process for free radically induced polymerization and graft copolymerization of a free radically polymerizable monomer onto a compound in the presence of a free radical initiator, an organic catalyst and in the presence or absence of an organic diluent where the organic catalyst is an alkenyl substituted cyanurate or isocyanurate and composition thereof.

30 Claims, 3 Drawing Sheets

POLYMERIZATION PROCESS AND THE POLYMERS THEREOF

TECHNICAL FIELD

The present invention relates to a catalytic process for free radically induced polymerization and/or graft copolymerization and the catalysts therefore.

In particular, this invention relates to a catalytic process for free radical polymerization and graft copolymerization where the catalyst is an alkenyl substituted (viz., allyl) cyanurate and isocyanurate.

More particularly, this invention relates to a catalytic process for free radical graft copolymerization of monomers onto polymers catalyzed by allyl substituted cyanurates and isocyanurates.

Even more particularly, this invention relates to a solid phase catalytic process for free radical graft copolymerization of at least one monomer onto a particulate polymer preferably powdered high molecular weight polymers catalyzed by allyl substituted cyanurates and isocyanurates.

This invention also relates to new compositions of matter derived from the catalytic process for free radical graft copolymerization.

BACKGROUND ART

Free radically induced polymerization and/or graft copolymerization are well known and general procedures for forming polymers and grafting reactive organic monomers onto polymers are well known using free radical polymerization generators.

The area of free radical initiated polymerization is extremely rich and diverse and has resulted in hundreds of patents and articles covering the technology. Therefore only those references considered in preparing this specification will be included.

In U.S. Pat. No. 4,870,145, Chromecek teaches the use of free radical polymerization for the formation of cross-linked beads of hydrophilic monomers. In U.S. Pat. No. 4,870,139, Catena teaches the use of free radical polymerization to prepare polyamide-acrylic graft copolymers. In U.S. Pat. No. 4,868,259, Burroway teaches the use of free radical polymerization of maleic anhydride, an aromatic vinyl monomer and an acrylate monomer under emulsion conditions. These references are meant only as examples of the conventional uses of free radical polymerization.

There are many articles and patents which cover free radically induced graft copolymerization. For example, U.S. Pat. No. 3,786,116 describes in broad terms the method of graft copolymerization. One important area of graft copolymerization involves the preparation of maleic anhydride-polyolefin graft copolymers. There are many processes and methods utilized for the preparation of these graft copolymers some of which are listed here: Teteryan et al. U.S.S.R. Patent 572,470 (1977); Otsuki et al. Japanese Patent JP 60/50145 and BY(85/50145); U.S. Pat. No. 3,433,777; U.S. Pat. No. 3,481,910; U.S. Pat. No. 3,519,609; U.S. Pat. No. 4,080,493; U.S. Pat. No. 4,161,571; U.S. Pat. No. 4,698,395; and Ide et al. in *J. Appl. Poly. Sci.*, 18, 963 (1974). However, none of the above references teach or suggest a catalytic process based on the unique catalysts of the present invention.

The development of free radical induced polymerization and graft copolymerization is described in all the above stated references, however, they do not disclose, discuss or teach the catalytic process of the present invention for accomplishing the free radical polymerization of free radically polymerizable monomers or the free radical graft copolymerization of polyolefins and other high molecular weight polymers including elastomers, thermoplastics, thermoplastic elastomers, high performance polymers or combination thereof with free radically polymerizable monomers and/or free radically graftable monomers.

Thus, it is desirable to have a highly efficient catalytic process for free radical polymerization and graft copolymerization in the presence of an organic catalyst. The polymers derived from the unique process of this invention are useful in paints, adhesives, compatibilizers, composites, bulk polymers, bulk plastics, bulk elastomers, fabrics, fibers, fillers for sterilizable packaging, metal coatings, solidified radioactive wastes, microbial resistant copolymers, improved dyeable fibers, paper reinforcing agents, and printable polymer films.

DISCLOSURE OF THE INVENTION

It is an object of this invention to provide a novel catalytic free radical polymerization process for manufacturing polymers in the presence of an organic catalyst and in the absence or presence of an organic or inorganic diluent.

It is a further object of this invention to provide a novel catalytic free radical graft copolymerization process for graft copolymerizing reactive organic reagents onto polymers in the presence of an organic catalyst and in the absence or presence of an organic diluent.

It is a further object of this invention to provide a novel solid phase catalytic free radical graft copolymerization process for graft copolymerizing reactive organic monomers onto polymers in the presence of an organic catalyst and in the absence or presence of an organic diluent.

It is still a further object of this invention to provide a novel, low temperature, low pressure, highly efficient, solid phase, catalytic free radical graft copolymerization process for graft copolymerizing free radically polymerizable or graftable monomers onto particulate polymers such as powdered, finely divided, pulverized, shredded or other small particle sized polymer forms, especially where the polymer has a high molecular weight.

It is still a further aspect of this invention to provide novel compositions of matter based on certain graft copolymers attained from the novel processes of the present invention.

The above object and aspects and further aspects of this invention will be described more fully in the remainder of the application.

The novel catalytic process comprises contacting at least one ethylenically unsaturated, free radically polymerizable monomer with about 0 to about 99% and preferably about 5% to about 95%, and more particularly from about 15% to about 85%, of a graftable polymer in the presence of a free radical generator, generating system and/or initiator, an organic catalyst of the type set forth hereinafter and in the presence or absence of an organic diluent. The percentage of graftable polymer is based on the number of grams of material charged into the reactor.

The process is carried out at a temperature sufficient to activate the free radical polymerization generator.

Normally, this temperature is in the range from about 70° C. to about 210° C.

The process is carried out at a pressure sufficient to maintain adequate monomer in polymerizing contact. Usually, the pressure is adjusted to maintain a major portion of the polymerizing or grafting mixture in a condensed state, preferably in a liquid state. The pressure of atmospheric to 20 atmospheres is particularly preferred when the polymerizing mixture contains volatile components or where the reaction is considerably exothermic or exergonic or heat liberating. The process can be carried out at a pressure near atmospheric either above or below atmospheric pressure to keep the polymerizing components in liquid of substantially non-volatile state.

The polymerization or graft copolymerization time is set primarily by the degree of polymerization or graft copolymerization desired and can usually range from seconds, to a few minutes to several hours, but normally from about 10 minutes to about 12 hours and preferably from about 10 minutes to about 6 hours.

The catalyst is selected from the representative and illustrative group consisting of the isocyanurates and the cyanurates have the formula (a) and (b) respectively, as set forth below:

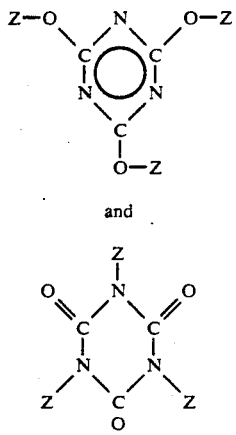

where each Z of both formula (a) and (b) is an organic radical selected from the representative and illustrative group consisting of an alkenyl radical, a cycloalkenyl radical, an alkyl substituted alkenyl radical, where the alkyl substituent preferably has from about 1 to about 10 carbon atoms. Tri-allyl cyanurate and tri-allyl isocyanurate are particularly preferred (where Z is allyl in both formula (a) and (b)).

The specific and representative organic catalysts include, but are not restricted to, allyl cyanurate, di-allyl cyanurate, tri-allyl cyanurate, allyl isocyanurate, di-allyl isocyanurate, tri-isocyanurate, alkyl-allyl cyanurates, alkyl-allyl isocyanurates where the alkyl radical has from 1 to 10 or more carbon atoms, tri-cyclohexenyl cyanurate or isocyanurate or similar cycloalkenyl cyanurates or isocyanurates.

The ethylenically unsaturated monomers useful for the polymerization/graft copolymerization process of the present invention can be selected from the representative and illustrative group consisting of:

olefins such as ethylene, propylene, butylene, pentylene and similar linear α-olefins, iso-olefins such as isobutylene, isopentylene and other similar iso-olefins;

poly alkylated olefins such as 2-butene 3-pentene 2-pentene, tri-methylethylene, tetra-methylethylene, and other similar poly alkylated olefins;

halogenated and polyhalogenated olefins such as vinyl chloride, vinylidene chloride, trichloroethylene, tetrachloroethylene, vinyl fluoride, vinylidene fluoride, trifluoroethylene, tetrafluoroethylene, vinyl bromide, 1,1,1-trifluoroprop-2-ene and other similar halogenated olefins;

vinyl ethers such as methyl vinyl ether, ethyl vinyl ether, phenyl vinyl ether, and other similar vinyl ethers;

vinyl acetates such as methyl vinyl acetate, ethyl vinyl acetate, and other similar vinyl acetates;

cyano substituted olefins such as acrylonitrile, vinylidene cyanide (1,1-dicyanoethylene), 1,2-dicyanoethylene, tricyanoethylenes, or tetracyanoethylene;

heterocyclic olefins such as vinyl pyridines, vinylimidazole, vinyl furan, furan, pyrrole, and other vinyl substituted heterocyclic olefins;

acrylates such as acrylic acid, methacrylic acid, acrylamide, methacrylamide, alkylated methacrylate such as methyl to duodecyl methacrylate, maleic acid, fumaric acid, maleic ester and diesters, fumaric ester and diesters, and other similar acrylate monomers;

aromatic olefins such as styrene, α-alkylstyrene, such as α-methylstyrene, halogenated styrenes such as fluorostyrenes, chlorostyrenes, bromostyrenes, alkylated styrenes such as methylstyrene, alkoxylated styrene such as methoxy styrene, di-methoxy styrenes, tri-methoxy styrenes, vinyl naphthalenes, substituted vinyl naphthalenes and other similar aromatic olefin monomers;

cyclic olefins such as maleic anhydride, alkylated maleic anhydrides, arylated maleic anhydrides, halogenated maleic anhydrides, maleimide, alkylated maleimide, cyclic olefins such as cyclopentene, cyclohexene, cycloheptene, cyclootene, and other similar cyclic olefins;

non-conjugated dienes such as 1,4-hexadiene, 1,4-pentadiene, 1,4-heptadiene, 1,6-hexadiene, 1,5-cyclooctadiene, and other free radically polymerizable non-conjugated diene monomers, conjugated dienes such as butadiene, 2,3-dimethylbutadiene, isoprene, piperylene, methyl-substituted piperylenes, cyclopentadiene and other free radically polymerizable conjugated diene monomers;

cyclic non-conjugated dienes such as 1,5-cyclooctadiene, dicyclopentadiene and other similar cyclic non-conjugated dienes;

cyclic conjugated dienes such as cyclopentadiene, 1,3-cyclohexadiene, 1,3-cyclooctadiene, and other similar cyclic conjugated dienes;

other olefins such as vinyl terminated or capped polyethers, vinyl capped polythioethers, allyl capped polyisobutylenes, and other similar vinyl or allyl capped polymer or macro monomers; and other free radically polymerizable, ethylenically unsaturated olefins.

The graftable polymers useful in the present invention can be selected from the representative and illustrative group consisting of:

oligomers of olefins, non-conjugated dienes or conjugated dienes or cooligomers of olefins, non-conjugated dienes or conjugated dienes in any proportion and any combination thereof;

polymers of olefins, non-conjugated dienes or conjugated dienes or copolymers of olefins, non-conjugated dienes or conjugated dienes in any proportion and any combination thereof; and combinations of any of the above in any proportion.

The oligomers, cooligomers, polymers and copolymers useful for the polymerization/graft copolymerization process of the present invention can be selected from the representative and illustrative group consisting of: polyethylene, polypropylene, polybutylene, polyisobutylene, polystyrene, poly α-methylstyrene, polyacrylonitrile, polyisoprene, polybutadine, EPDM, polyvinylether, polyvinylalcohol, polyacrylates, substituted polyacrylates, other polyolefins and polydienes and combinations and copolymers of any of these polymers.

The terms cooligomer and copolymer are meant to indicate any type of cooligomer or copolymer including, but not restricted to, random copolymers, tapered block copolymers, blocked copolymers, graft copolymers, coupled copolymer and block copolymers, starred copolymers and block copolymers, terpolymers or multiple monomer polymers where more than three monomers are used or any combination thereof in any portion.

The free radical initiator can be selected from the representative and illustrative group consisting of organic peroxides, azo containing free radical initiators such as, but not restricted to, azo-bis-isobutyronitrile and other similar azo free radical initiators and other similar free radical generators, generator systems and/or initiator.

The optional diluent can be selected from the representative and illustrative group consisting of methylchloride, dichloromethane, chloroform, carbon tetrachloride, dichloroethanes, or similar chlorinated hydrocarbon solvents, benzene, toluene, xylenes, and other similar aromatic solvents, cyclohexane, hexane and other similar cycloalkane or alkane solvents or mixtures thereof.

When the graftable polymer of the novel catalytic polymerization process is an oligomer or a polymer, the process results in a graft copolymer.

In the case of the graft copolymerization process having greater than 0% of a graftable polymer (based on the number of grams of material charged into the reactor), a polymer which can be free radically grafted, the process can be carried out in solution where the solvent is one or more of the above mentioned diluents. Preferably, the graftable polymer is present in the range from about 5% to about 95%, and more particularly from about 15% to about 90%, with the remaining percentage being made up of diluent, generator or initiator and catalyst.

While in the case of high molecular weight polymer the polymerization process can be carried out in the solid phase at a temperature above the polymer's melt or softening point or at a temperature below the polymer's melt or softening point. This latter procedure can be accomplished by using particulate polymers such as powdered, finely divided, pulverized, shredded, pellets or other similar small particle sized polymers. Optionally, the particulate polymer process can be performed in the presence of a small amount of diluent. The diluent is thought to act as an interfacial agent which etches the polymer surface to promote grafting. Usually, the amount of diluent added ranges from about 0% to about 30% and preferably about 5% to about 20% by weight based on the charge. Preferably, the solid phase graft copolymerization reaction occurs when the graftable polymer is presence in percentages ranging from about 5% to about 95% and particularly preferred from about 15% to 85% (where the percentage is based on the number of grams charged into the reactor) where the remaining percentage is made up of monomer or monomers, free radical, generator catalyst, and optionally an organic diluent which is preferably a solvent for the system.

When a diene monomer or other similar difunctional monomer is used in the present process, molecular weight building through crosslinking can and does occur. Therefore, lower molecular weight polymers, i.e. oligomers, are preferred.

The novel process can be performed in a wide variety of reactor systems and designs including batch type autoclave reactors, continuous stirred tank reactors, or any other continuous or batch tank type reactor, segmented continuous reactors, single or twin screw extruders in the case of solid phase graft copolymerization or bulk polymerizations or any other type of internal continuous or batch reactor.

All percentages for the novel process relate to the total number of grams charged into the reactor. Thus, if 100 grams of ingredients are charged into the reactor and the graftable polymer is present at 75%, then the reactor would be charged with 75 grams of the graftable polymer.

BEST MODE FOR PERFORMING THE PROCESS

Figure 1:
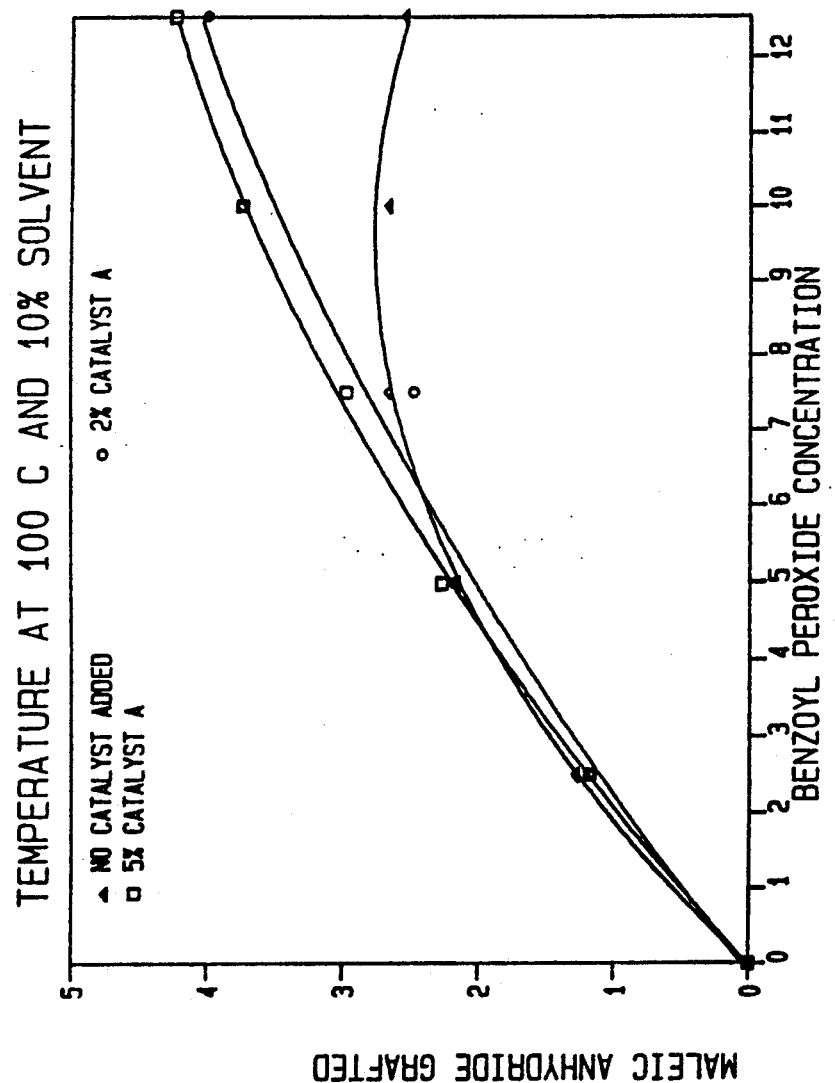
FIG. 1 shows the extent of grafting curves of maleic anhydride onto polypropylene of a molecular weight of 100,000 to 250,000, at 100° C. and in the presence of 10% benzene, the interfacial agent; curve 1 shows the effect of increasing benzoyl peroxide concentration on grafting efficiency (indicated by triangular markers); curve 2 shows the effect of increasing benzoyl peroxide concentration on grafting efficiency at 2% of triallyl cyanurate (indicated by circular markers); and curve 3 shows the effect of increasing benzoyl peroxide concentration on grafting efficiency at 5% triallyl cyanurate catalyst (indicated by rectangular markers).

Applicants have found a class of organic catalysts that act to improve free radical polymerization and graft copolymerization. This class of organic catalysts is effective in improving the incorporation of different monomers into polymer made from free radically induced polymerization. Normally, free radical polymerization is ineffective in forming a wide range of copolymer compositions because the reaction kinetics preclude such compositional diversity. The catalysts of the present invention are capable of modifying the kinetic parameters of free radical polymerization and, thus, allowing the manufacture of more compositionally diverse copolymers using a readily available and moderately inexpensive free radical polymerization process.

Applicants have also found that the class of organic catalysts described herein are capable of increasing the incorporation of organic monomers via free radically induced graft copolymerization.

A particularly preferred graft polymerization process comprises contacting particulated polymers such as powdered, finely divided, pulverized, shredded, pelletized or similar small particle sized polymers and forming them in a heated, low-shear, multi-port, inert gaspurgeable constant-speed agitated reactor, with a monomer, in the presence of a free radical initiator, an organic catalyst and in the presence or absence of a small amount of an organic diluent at a temperature sufficient to activate the free radical initiator for a time sufficient to cause a graft incorporation of the ethylenically unsaturated monomer into the polymer. When a diene monomer or other similar dyfunctional monomer is used in the present process, molecular weight building through crosslinking can and does occur. Therefore, lower molecular weight polymers, i.e., oligomers, are preferred. Usually the reaction time varies from about 10 minutes to about 6 hours and preferably from about 30 minutes to about 2 hours to accomplish the desired polymerization and/or grafting copolymerization. The initiator, catalyst, monomer and optional diluent can be added incrementally to the particulate polymer with a time lapse between each addition, where the usual time lapse is from about 10 minutes to about 30 minutes. The number of incremental additions of the initiator, catalyst, monomer and optional diluent can be any number that allows for efficient mixing and efficient reaction during mixing. This process can also be made into a continuous process by a continuous addition of the initiator, catalyst, monomer and optional diluent into a continuous reactor. The process of the present invention can be carried out in either batch or continuous reactors or reactor system known to one of ordinary skill in the art including extruders, moving bed reactors, continuously stirred tank reactor, stirred tank reactors or any similar batch or continuous reactor or reactor system. The optional diluent facilitates the grafting reaction. The molecular weight of the polymers should preferably be sufficiently high to allow powdering. In the case of polyolefins or elastomers or plastics these molecular weights are normally about 50,000 to 1,000,000 and preferably above 100,000 but lower and higher molecular weights can be used.

Many of the graft copolymers of the present invention are also novel and are ideally suited as compatabilizing agent for compatabilizing incompatable polymers blends giving rise to new polymer alloys. Polymers alloys meaning blends of incompatable polymers made compatable by a compatabilizing agent. These new copolymers can be used to prepare polyolefin-poly aromatic olefin alloys such alloys as polypropylene-polystyrene alloys by incorporating a given amount of a styrene-polypropylene graft copolymer in a blend of polypropylene and polystyrene. Poly aromatic olefins is used in this context to refer to polystyene and polymer of styrene derivatives such as alkylated or halogenated styrenes or poly vinyl naphthalenes or poly vinyl heterocyclic aromatic olefins such as poly vinyl pyridine, poly vinyl quinoline and the like or poly aromatic olefins listed about that have been graft copolymerized with a reagent that does not render the poly aromatic olefin—polyolefins compatable such as maleic anhydride. Polyolefin is this context can also include polyolefins that have been graft copolymerized with reagent that do not render them compatable with the poly aromatic olefin—polyolefin blends compatable such as maleic anhydride.

Other compatabilizing graft copolymers can also be prepared from the novel catalytic graft copolymerization process of the present invention such as, but not restricted to, styrene grafted polyethylene, alkylated styrene grafted polyethylene, halogenated styrene grafted polyethylene, alkylated styrene grafted polypropylene, halogenated styrene grafted polypropylene, and the like.

The alloys can be prepared by blending together a incompatable polyolefin with a poly aromatic olefin and adding sufficient graft copolymer where the graft copolymer contains segments of the two imcompatable polymers to render the blend compatable.

The alloys can be prepared comprising from about 4% to about 95% by weight of a polyolefin, from about 4% to about 95% by weight of a poly aromatic olefin and from about 1% to about 30% or more by weight of a graft copolymer of the polyolefin and the poly aromatic olefin. Particularly preferred composition comprise from about 40% to about 80% of a polyolefin, from about 40% to about 80% of a poly aromatic olefin and from about 5% to about 20% of a graft copolymer of the polyolefin and the poly aromatic olefin. Thus, 100 grams of a 45% polyolefin, 45% poly aromatic olefin, 10% compatabilizer would have 45 grams of each polymer and 10 grams of compatabilizer.

The invention will be better understood by reference to the following illustrative and representative examples in which all percentages are in weight based on polymer charge unless otherwise designated.

EXAMPLE 1

General Solid Phase Graft Copolymerization Procedure

This example illustrates the general procedure used to prepare maleic anhydride (MA) graft copolymerized polypropylene (PP). This example illustrates the general procedure for a total batch weight of 200 grams with 10% by weight of MA, 5% by weight of catalyst, 12.5% by weight of free radical generator, and 10% by weight of benzene with the balance of the weight being PP and a reaction temperature of 100° C. The weight percentages of all ingredient can be varied as well as the temperatur and these values are only chosen for purposes of illustration.

125 grams (62.5% by weight) of particulate (powdered) PP was added to the reactor and the mixing rotors were turned on. Nitrogen was purged into the reactor and the PP was heated to 100° C. The nitrogen purge was turned off. 20 grams (10% by weight) of MA, 25 grams (12.5% by triallyl cyanurate and 20 grams (10% by weight) of benzene were divided into four equal parts by weight. The portions were added into the reactor at 15 minute intervals. The reaction was terminated after 60 minutes by emptying the contents of the reactor into a sample container. 20 gram sample of the reaction product was placed in a 500 mL round bottom flask. The sample was extracted with 400 mL of distilled water for 24 hours. The extracted solution was stored for further analysis. The extracted sample was washed with distilled water and dried in hot air for over 4 hours.

Quantitative determination of maleic anhydride was performed using wet chemical methods. The procedure used for wet chemical analysis is based on dissolution of the polymer followed by titration.

Qualitative determination of maleic anhydride was performed by Fourier Transform Infrared spectroscopy (FTIR).

EXAMPLE 2

This example consists of a set of experiments according to example 1 in which the tri-allyl cyanurate, the catalyst, and the initiator (benzoyl peroxide) concentrations were varied to determine the relationship between the catalyst concentration and the free radical initiator concentration on the final graft efficiency. These reactions were all carried out at 100° C. and in the presence of 10% by weight of benzene. Eighteen experiments were made.

The first experiment was performed at 0% benzoyl peroxide concentration and 0% tri-allyl cyanurate concentration and was a blank.

A set of three experiments were then performed at each of the following levels of benzoyl peroxide concentration: 2.5%, 5%, 7.5%, 10% and 12.5% by weight. Each set of three experiments for the different levels of benzoyl peroxide involved different levels of the tri-allyl cyanurate suspended in the interfacial benzene agent. The first level was 0% tri-allyl cyanurate, the second level was 2% of the tri-allyl cyanurate; and the third was 5% of the tri-allyl cyanurate.

The results are graphically presented in FIG. 1 where a pronounced increase in graft inefficiency is seen for tri-allyl cyanurate concentrations between 2-5% and for benzoyl peroxide amounts greater than 7.5% with the highest graft inefficiency resulting from 12.5% benzoyl peroxide and 5% tri-allyl cyanurate.

EXAMPLE 3

This example deals with a set of reactions run according to the procedure of Example 1, with the benzoyl peroxide as initiator and the tri-allyl cyanurate as catalyst in the presence of 10% by weight of benzene and at a temperature of 120° C. Concentrations were varied to ascertain the efficiency of grafting.

Figure 2:
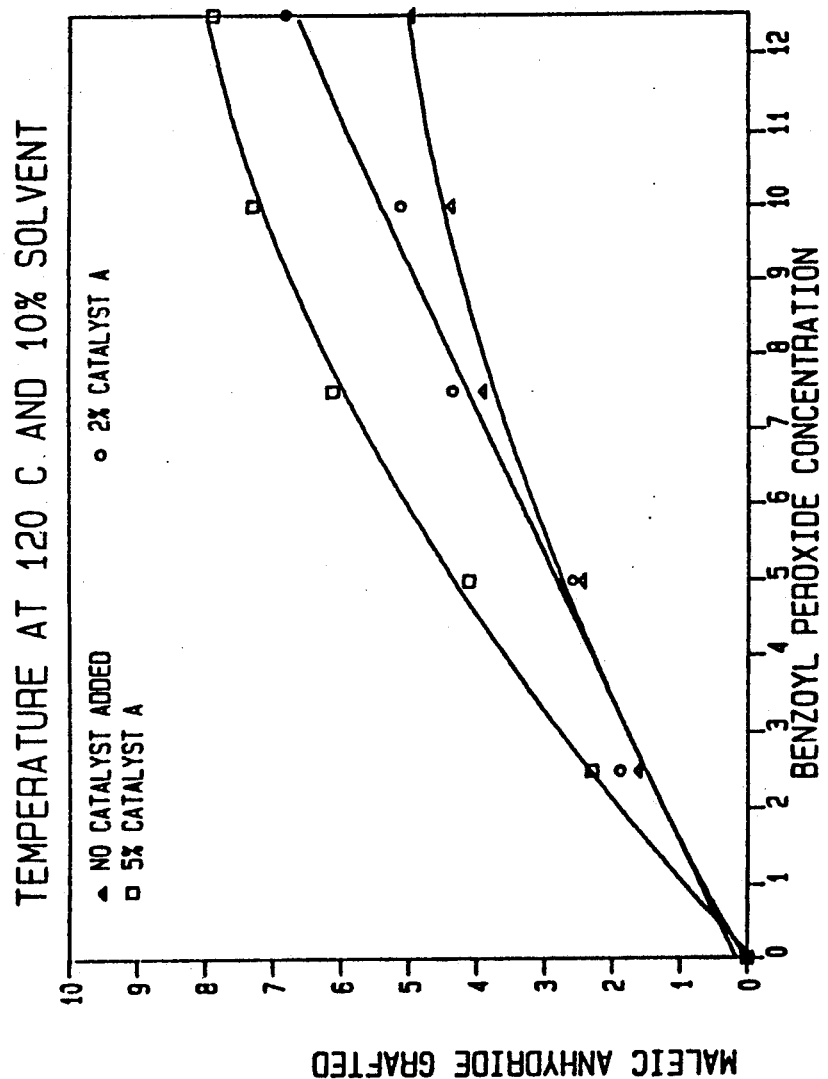
FIG. 2 shows the similar results as FIG. 1 at 120° C.
Figure 3:
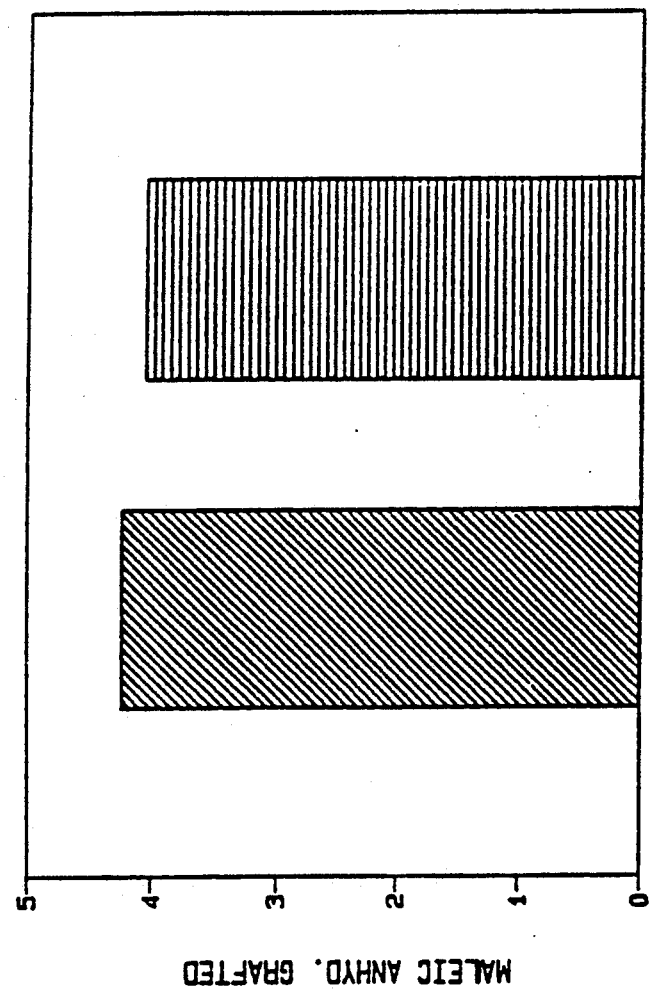
FIG. 3 shows the difference in grafting efficiency for two different interfacial agents—benzene and toluene.

This set of reactions consisted of 16 reactions. The first reaction is a blank which essentially means there was no benzoyl peroxide and no tri-allyl cyanurate added. The rest of the experiments comprised five levels of benzoyl peroxide and three levels of tri-allyl cyanurate. The benzoyl peroxide levels are 2.5%, 5%, 7.5%, 10%, and 12.5% shown in FIG. 2, the results of this experiment are that 5% tri-allyl cyanurate at all levels of benzoyl peroxide showed marked advantages over either 2% or no tri-allyl cyanurate at all. The 2% level began to show distinct differences between the uncatalyzed reaction at amounts over 5% benzoyl peroxide.

EXAMPLE 4

This example deals with a set of two PP reactions using 12.5% initiator, 10% maleic anhydride and two different diluents at the 10% by weight level. The two diluents were benzene and toluene. as shown in FIG. 4, Little difference is seen between the behavior of the grafting efficiency with respect to either of these two solvents as is shown in FIG. 4.

EXAMPLE 5

This example illustrates the preparation of polystyrene (PS) grafted polypropylene (PP) using either triallyl cyanurates or triallyl isocyanurates.

The reaction was carried out according to the general scheme recounted by Example 1, except that styrene was used as the monomer instead of maleic anhydride at a level of about 10% by weight. The reaction was performed in the presence and absence of 10% by weight of benzene with little difference being noted.

The grafted product was extracted with acetone and pyridine to remove the unreacted styrene monomer and the free ungrafted polystyrene. The graft levels were quantitatively determined by an elemental analysis method.

Qualitative determination of styrene in the copolymer was done by Fourier Transform Infra-red spectrometry (FTIR) and by $^{13}C$ solid state 50 MHz nuclear magnetic resonance spectroscopy ($^{13}C$ NMR). The $^{13}C$ NMR spectra for polypropylene and polypropylene-polystyrene copolymer show a PP and PS peak. The amount of PS can be varied by the variation in reaction condition as one skilled in the art would be able to perform.

Preliminary results show that the process successfully grafts styrene monomer to polypropylene. Instead of styrene, its derivatives including para-methyl styrene, methyl styrene, α-methylstyrene, halogenated styrene such as chlorostyrene and vinyl toluene, can be used to graft on PP to give a product that compatabilizes PP and polystyrene and/or its polymeric derivative including poly para-methyl styrene, poly-α-methylstyrene, polychlostyrene, and poly-2,5-dimethylstyrene to give unique blends and alloys.

EXAMPLE 6

This example illustrates the preparation of maleic anhydride (MA) - polystyrene (PS) graft copolymer.

The procedure described in Example 1 was used to graft MA onto polystyrene. The reaction was performed in the exact same many except the polypropylene was replaced by polystyrene. FTIR analysis showed MA incorporation.

EXAMPLE 7

This example illustrates the preparation of polypropylene (PP) - polystyrene (PS) alloys using a graft copolymer of Example 5 as a compatabilizing agent by melt processing.

70 grams of PP, 20 grams of PS and 10 grams of a graft copolymer of Example 5 were added to a melt processing reactor. The mixture was melted together with stirring at a temperature above the melt point of polypropylene. The resulting alloy showed a single phase by electron microspocy. FTIR, NMR and differential scanning calorimetry data also showed the product to be an alloy with no separate PP or PS phases.

EXAMPLE 8

This example illustrates the preparation of polypropylene (PP) - [polystyrene - maleic anhydride graft copolymer] (PS-MA) alloys using a graft copolymer of Example 5 as a compatabilizing agent by melt processing.

70 grams of PP, 20 grams of PS-MA of Example 6 and 10 grams of a graft copolymer of Example 5 were added to a melt processing reactor. The mixture was melted together with stirring at a temperature above the melt point of polypropylene. The resulting alloy showed a single phase by electron microspocy. FTIR, NMR and differential scanning calorimetry data also showed the product to be an alloy with no separate PP or PS phases.

EXAMPLE 9

This example illustrates the preparation of polypropylene (PP) - polystyrene (PS) alloys using a graft copolymer of Example 5 as a compatabilizing agent by a solution process.

10 grams of PP and 10 grams of PS are dissolved in 1000 mL of toluene. 2 grams of a copolymer of Example 5 is added. The mixture is stirred to affect adequate mixing. The blend is poured into an evaporating dish and the solvent evaporated. The film is oven dried to remove traces of toluene.

FTIR, NMR and differential scanning calorimetry show the product to be an alloy with no separate PP or PS phases.

The solution and melt process for making the above alloys are subject to wide variation in the amount of polyolefin and poly aromatic olefin and compatabilizing copolymer. In fact, the amount of compatabilizer can be just the mere sufficient amount to affect compatabilization or in amount in excess to the amount. The above alloy forming procedures can be used for the compatabilization of any incompatable blend of polyolefins and poly aromatic olefins when a compatabilizing graft copolymer made by the novel process of this invention is added.

Although the above examples used tri-allyl cyanurate as the organic catalysts, related cyanurates and isocyanurates can be used in its stead including allyl cyanurate, di-allyl cyanurate, tri-allyl cyanurate, allyl isocyanurate, di-allyl isocyanurate, tri-isocyanurate, alkyl-allyl cyanurates, or alkyl-allyl isocyanurates.

Polyethylene, polyisobutylene and the polymers of the diolefins of $C_4$ to $C_8$ or copolymers of the $\alpha$-olefins and dienes can be grafted by the above procedures to give graft polymers.

While in accordance with the patent statutes the best mode and preferred embodiment of the invention has been described, it is to be understood that the invention is not limited thereto, but rather is to be measured by the scope and spirit of the appended claims.

What is claimed is:

1. A method of grafting at least one ethylenically unsaturated monomer onto a graftable polymer comprising the steps of contacting said monomer with said polymer in the presence of a free radical generator, an organic catalyst and in the absence or presence of a diluent at a temperature sufficient to activate the free radical generator for a time sufficient to attain the desired degree of grafting and at a pressure sufficient to maintain adequate monomer in polymerizing contact, said catalyst being selected from the group consisting of:

(a)

and

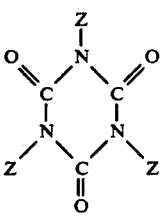

(b)

where each Z in formula (a) and (b) is an organic radical selected from the group consisting of an alkenyl radical, an alkyl substituted alkenyl radical, a cycloalkenyl radical, or an alkyl substituted cycloalkenyl radical where the alkyl substituent preferably has from about 1 to about 10 carbon atoms, said monomer being an olefin and said graftable polymer is selected from the group consisting of polyethylene, polypropylene, polyisobutylene and copolymers thereof.

2. A process according to claim 1, wherein said catalyst has the formula of (a).

3. A process according to claim 1, wherein said catalyst is tri-allyl cyanurate.

4. A process according to claim 1, wherein said catalyst has the formula of (b).

5. A process according to claim 4, wherein said catalyst is tri-allyl isocyanurate.

6. A process according to claim 1, wherein said monomer is styrene or para-methyl styrene and said graftable polymer is polypropylene.

7. A process according to claim 1, wherein said monomer is a cyclic olefin and said graftable polymer is a polyolefin, polydiene or a polyolefin-polydiene copolymer or a mixture thereof.

8. A process according to claim 7, wherein said monomer is maleic anhydride and said graftable polymer is polypropylene.

9. A process according to claim 1, wherein said generator are organic peroxides and azo free radical initiators.

10. A process according to claim 1, wherein said time is from about 10 minutes to about 12 hours.

11. A process according to claim 10, wherein said time is from about 30 minutes to about 6 hours.

12. A process according to claim 1, wherein said diluent is selected from the group consisting of methylchloride, dichloromethane, chloroform, carbon tetrachloride, dichloroethanes, benzene, toluene, xylenes, cyclohexane, hexane or mixtures thereof.

13. A method of grafting at least one ethylenically unsaturated monomer onto a graftable particulate polymer comprising the steps of contacting said monomer with said particulate polymer in the presence of from about 5% to about 12.5% of a free radical generator by weight of monomer and polymer, from about 2% to about 5% of an organic catalyst by weight of monomer and polymer, and in the absence or presence of a diluent at a temperature sufficient to activate the free radical generator, for a time sufficient to attain the desired degree of grafting and at a pressure near atmospheric, said catalyst being selected from the group consisting of:

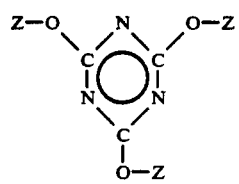

(a)

and

-continued

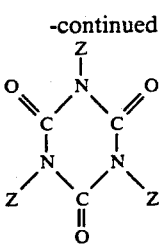
(b)

where each Z in formula (a) and (b) is an organic radical selected from the group consisting of an alkenyl radical, an alkyl substituted alkenyl radical, a cycloalkenyl radical, or an alkyl substituted cycloalkenyl radical where the alkyl substituent preferably has from about 1 to about 10 carbon atoms, said monomer is selected from the group consisting of α-olefins and cyclic olefins, and said particulate polymer is selected from the group consisting of polyethylene, polypropylene, polyisobutylene and copolymers thereof.

14. A process according to claim 13, wherein said catalyst has the formula of (a).

15. A process according to claim 14, wherein said catalyst is tri-allyl cyanurate.

16. A process according to claim 13, wherein said catalyst has the formula of (b).

17. A process according to claim 16, wherein said catalyst is tri-allyl isocyanurate.

18. A process according to claim 13, wherein said time is from about 10 minutes to about 12 hours.

19. A process according to claim 18, wherein said time is from about 30 minutes to about 6 hours.

20. A process according to claim 13, wherein said initiator, said catalyst and optional diluents are added in a plurality of additions, said additions occurring about every 10 to 20 minutes.

21. A process according to claim 13, wherein said monomer is styrene.

22. A process according to claim 13, wherein said monomer is maleic anhydride.

23. A process according to claim 13, wherein said particulate polymer is polypropylene.

24. A process according to claim 13, wherein said particulate polymer has a molecular weight between 150,000 and 500,000.

25. A process according to claim 13, wherein said particulate polymer is powdered to a particle size from about 100-200 mesh (U.S. Standard Sieve).

26. A process according to claim 13, wherein said catalyst is added in the range from about 2% to 10% by weight of said polymer and the free radical initiator is added in the range from about 5% to 15% by weight of said polymer.

27. A process according to claim 13, wherein said diluent is added in the range from about 5% to 15% by weight of said polymer.

28. A process according to claim 13, wherein said diluent is added in the range from about 8 to about 10% by weight of said polymer.

29. A process according to claim 13, wherein said diluent is selected from the group consisting of benzene, toluene, xylenes, cycloalkanes, alkanes, or other similar organic solvents.

30. A method of grafting at least one ethylenically unsaturated monomer onto a graftable polymer comprsiing the steps of contacting said monomer with said polymer in the presence of from about 5% to about 12.5% of a free radical generator by weight, of monomer and polymer, from about 2% to about 5% of an organic catalyst by weight of monomer and polymer, and in the absence or presence of a diluent at a temperature sufficient to activate the free radical generator for a time sufficient to attain the desired degree of grafting and at a pressure sufficient to maintain adequate monomer in polymerizing contact, said catalyst being selected from the group consisting of:

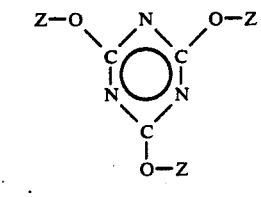
(a)

and

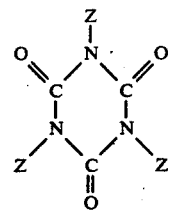
(b)

where each Z in formula (a) and (b) is an organic radical selected from the group consisting of an alkenyl radical, an alkyl substituted alkenyl radical, a cycloalkenyl radical, or an alkyl substituted cycloalkenyl radical where the alkyl substituent preferably has from about 1 to about 10 carbon atoms, said monomer is selected from the group consisting of an α-olefin and a cyclic olefin, and said graftable polymer selected from the group consisting of polyethylene, polypropylene, polyisobutylene and copolymers thereof.

* * * * *